UNITED STATES PATENT OFFICE.

FRED M. LOCKE, OF VICTOR, NEW YORK.

INSULATOR.

1,225,147.　　　Specification of Letters Patent.　　Patented May 8, 1917.

No Drawing.　　Application filed September 4, 1914. Serial No. 860,160.

*To all whom it may concern:*

Be it known that I, FRED M. LOCKE, a citizen of the United States, and resident of Victor, in the county of Ontario, in the State of New York, have invented new and useful Improvements in Insulators, of which the following is a full, clear, and exact description.

This invention relates to certain improvements in insulators and refers more particularly to a composition electric insulation as a new article of manufacture and is closely related to my copending application, Serial No. 845,371 filed June 16, 1914, and reference is hereby made to my copending application, Serial No. 482,382, filed March 9, 1909 for manufacture of high potential porcelain and glass insulators which application has matured into Letters Patent No. 1,120,951, 1,127,042 and 1,156,163, and reference is further made to my Letters Patent No. 1,091,678, dated March 31, 1914 and No. 1,091,679, dated March 31, 1914, respectively.

The primary object of the invention is to produce a composition material susceptible of various uses, but particularly for insulators for high potential electric conductors which is unaffected by temperature and climatic changes, and to increase for insulating purposes its inductive capacity, dielectric strength and resistance to puncture or disintegration by electric current and reduce its coefficient of expansion.

Glass of nearly all kinds has a large coefficient of expansion and cracks easily from sudden changes in temperature, rendering it unsuitable under many and various conditions for insulating purposes. Pure silica, however, has a very small coefficient of expansion and can stand all temperature changes from red heat to very cold without cracking.

A further object, therefore, of this invention is to produce a glass or porcelain of high silica content to prevent cracking from sudden changes of temperature.

In glasses containing 70 or 75% of silica, it requires very high heat and long firing to fuse and it is hard to form them into shape and difficult to eliminate bubbles, owing to the viscosity of the mass. I have discovered that by the use of a body of the halogen group or of a halogen compound, I can flux silica very easily and shape it while soft, owing to the affinity of the elements of the halogen group, with particular reference to fluorin, or halogen compounds for silica and aluminum. Under fusion, I am enabled to form these materials into a homogeneous body at a low heat. For example: In a batch mixture of the following weights, 80% silica; 17% cryolite; 3% boric acid, I find that after fusion the mass contains from analysis 90% of silica. Referring to this particular example, cryolite comprises more than 50% of fluorin and in this instance, fluorin, or as otherwise determined some other halogen element, seems to have disappeared from the mass when the latter becomes cool, leaving a high content of silica, and in this example, a small amount of aluminum and sodium and the incorporated boron.

That this is the true explanation, and that the halogen body largely disappears by volatilization is clearly shown by the very small percentage of such body in the composition mass, and the further fact that under fusion the silica and halogen compound quickly and easily come to a fluid state, but that long continued fire will bring the fluid back to a thick rubbery state that is much harder to mold and form than at the earlier stages of the firing. This change from fluid state to a thick rubbery state is accounted for by the volatilization of the halogen element.

Glass of low expansion coefficient is nearly all very low in alkalis and invariably glass of high expansion coefficient embodies large percentages of alkalis. I have found that by the use of cryolite I can readily fuse a mix comprising seventy per cent. (70%) or more of silica and produce a glass which is low in alkali and has a very small expansibility,—say not to exceed .0000050. I account for this by the fact that fluorin, which constitutes more than fifty per cent. (50%) of cryolite, has a great affinity for silica and during, or after, fluxing the fluorin is vaporized leaving substantially the sodium oxid and alumina, which are the other constituents of cryolite. For example, I have found that by using say five parts of cryolite I can flux a greater amount of silica or alumina than if I used five parts of ordinary flux, such as sodium carbonate, and the resulting glass made with cryolite will be much lower in alkali and of considerably lower expansion coefficient.

I believe that I am the first to produce a glass of high silica content and very low coefficient of expansion,—say not greater than .0000050, due to the relatively small amount of alkali used, by fusing silica material, boron material, and cryolite.

I may use in combination with silica any of the following elements: fluorin, chlorin, bromin, or iodin, constituting the halogen group or any compound or compounds of these elements separately or collectively, such as fluorspar or cryolite, chiolite or any of the fluorite group, etc.

By the use of halogen elements or compounds forming a homogeneous mass having a very high content of silica, I have produced an insulator that has a very low coefficient of expansion and at the same time a very good insulator, superior as regards specific inductive capacity and dielectric strength to either glass or porcelain.

To the composition above described, I add boron or boron in some of its compound forms, ranging in amount from 1% to 60%, in accordance with the specific inductive capacity, etc., required, to further increase in combination with the other elements the specific inductive capacity and dielectric strength and to decrease the coefficient of expansion. In tests which I have made relative to the incorporation of boron in insulator bodies, I find that with a 10 inch disk insulator formed of a composition including boron, it required 110,000 volts to arc around, while with a 10¾ inch disk of the best porcelain it requires only 90,000 volts, and with a glass disk of the same size only 80,000 volts.

These last advantages result from a combination of the fact that under fusion boron forms no compound with hydrogen with the further fact that when the electric current is applied to the insulator, it affects the atmosphere or atmosphere surrounding the insulator and separates it into ions. Now boron or compounds of boron have the property of preventing ionization of the atmosphere, thereby proportionately increasing the amount of voltage the insulator will stand. And preferably to the elements above set forth either in elemental or compound forms, I add a small percentage of soda or potash to increase the ease and rapidity of the fusing operation.

In my copending application, Serial No. 845,371, I have claimed a glass or an insulator formed by fusing silicic material, boron material and halogen material to form a homogeneous body. This application contains the broad claims to the product together with specific claims for cryolite as the halogen-carrying element of the combination.

For the purpose of forming an insulator having a high content of silica combined with aluminum, I may fuse feldspar, or any other aluminum silicate, with fluorin material, or some other of the halogen elements or compounds; or, I may fuse silica or a compound of silica with cryolite, or with a halogen element or compound, in combination with aluminum, and I desire to claim herein broadly the fusion of silica and aluminum, either in elementary form or any compound forms, with an element of the halogen group or a halogen compound, and all preferably in combination with boron or boron in some of its compound forms, such as borax or boracic acid, and for the purpose of this application and the claims hereto appended a compound of any of the elements herein claimed is deemed the full equivalent of the element as claimed, and may be used in substitution therefor without departing from the spirit of the invention as herein described and claimed.

What I claim is:

1. An insulator of high silica content formed by fusing silicic material with cryolite and boron material to form a homogeneous body and molding the mass to desired form.

2. An insulator of high silica content formed by fusing silicic material with cryolite and boron material to form a homogeneous body.

3. A vitreous body formed by fusing silicic material with cryolite and boron material to form a homogeneous body.

4. The method of forming a homogeneous body of high silica content consisting in fusing silicic material, cryolite and boron material to form a homogeneous body.

5. An insulator for high voltage current formed by fusing silicic material, boron material and cryolite to form a homogeneous body.

6. A glass comprising seventy or more per cent. of silica, boric oxid, alumina, and a small amount of alkali, and having a coefficient of expansion of less than .0000050.

7. An insulator for line conductors comprising silica, boron material and cryolite fused together in a homogeneous body.

8. A glass formed by fusing a large percentage of silicic material, with boron material and cryolite to form a homogeneous body.

9. A glass comprising seventy or more per cent. of silica, alumina, boron oxid and a small amount of an alkali and having a coefficient of expansion not greater than .0000050.

10. A glass of high silica content formed by fusing boron material, silicic material, alumina material, halogen material and a small amount of an alkali to form a homogeneous body.

11. A heat resisting glass of low co-efficient of expansion comprising boron oxid, alumina, a small amount of an alkali and a relatively large amount of silica and having a coefficient of expansion not greater than .0000050.

12. A heat-resisting glass of low coefficient of expansion comprising boron oxid, alumina, sodium oxid, a relatively large percentage of silica and a small percentage of potassium oxid and having a coefficient of expansion not greater than .0000050.

13. A vitreous body of low coefficient of expansion formed by fusing silicic material with cryolite, boron material, and an alkali to form a homogeneous body.

14. A vitreous body of low coefficient of expansion formed by fusing silicic material with cryolite, boron material, and potassium material to form a homogeneous body.

15. An insulator for line conductors formed by fusing silicic material with cryolite, boron material, and an alkali to form a homogeneous body.

16. An insulator for line conductors formed by fusing silicic material with cryolite, boron material and potassium material to form a homogeneous body.

17. A glass of low expansion coefficient formed by fusing silicic material, boron material, cryolite and an alkali, and showing from analysis silica, boric oxid, alumina and an alkali.

18. A glass formed by fusing silicic material, boron material, cryolite and an alkali, and showing from analysis silica, boric oxid, alumina and an alkali, and having an expansion coefficient not greater than .0000050.

In witness whereof I have hereunto set my hand this 29th day of August 1914.

FRED M. LOCKE.

Witnesses:
W. A. HIGINBOTHAM,
E. C. BRISTOE.